(12) United States Patent
Son et al.

(10) Patent No.: US 12,202,389 B2
(45) Date of Patent: Jan. 21, 2025

(54) VEHICLE SEAT FRAME

(71) Applicant: HYUNDAI TRANSYS INCORPORATED, Seosan-si (KR)

(72) Inventors: Dong Hyeon Son, Hwaseong-si (KR); Soo Young Chae, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 367 days.

(21) Appl. No.: 17/954,487

(22) Filed: Sep. 28, 2022

(65) Prior Publication Data
US 2023/0103998 A1 Apr. 6, 2023

(30) Foreign Application Priority Data

Oct. 5, 2021 (KR) .................. 10-2021-0131899

(51) Int. Cl.
*B60N 2/20* (2006.01)
*B60N 2/02* (2006.01)

(52) U.S. Cl.
CPC ............ *B60N 2/20* (2013.01); *B60N 2/02253* (2023.08)

(58) Field of Classification Search
CPC .... B60N 2/20; B60N 2/02253; B60N 2/2213; B60Y 2304/03
See application file for complete search history.

(56) References Cited

U.S. PATENT DOCUMENTS

| | | | | |
|---|---|---|---|---|
| 4,720,144 A | * | 1/1988 | Heesch | B60N 2/2213 297/362 |
| 4,846,526 A | * | 7/1989 | Allen | B60N 2/20 297/378.12 |
| 10,857,910 B2 | * | 12/2020 | Madhu | B60N 2/123 |
| 2008/0100115 A1 | * | 5/2008 | Kojima | B60N 2/2213 297/361.1 |
| 2014/0225400 A1 | * | 8/2014 | Nagayasu | A47C 7/5068 297/75 |
| 2016/0264024 A1 | * | 9/2016 | Michels | B60N 2/0825 |
| 2017/0088021 A1 | * | 3/2017 | Noguchi | B60N 2/2362 |
| 2017/0341538 A1 | * | 11/2017 | Keyser | B60N 2/20 |
| 2018/0050616 A1 | * | 2/2018 | Nozue | B60N 2/2356 |

FOREIGN PATENT DOCUMENTS

| | | |
|---|---|---|
| CN | 113103933 A | 7/2021 |
| KR | 10-2007-0000127 A | 1/2007 |
| KR | 10-0786009 B1 | 12/2007 |
| KR | 10-2011-0009282 A | 1/2011 |
| KR | 20200072006 A | 6/2020 |

\* cited by examiner

*Primary Examiner* — Mark R Wendell
(74) *Attorney, Agent, or Firm* — Bridgeway IP Law Group, PLLC; Jihun Kim (57) ABSTRACT

A vehicle seat frame is proposed. The vehicle seat frame includes: a base frame arranged at a vehicle seat, having a placing space therein; a lock pin lever formed at a center portion of the placing space; an inside gear configured to rotate along an inner surface of the placing space in an operation of the lock pin lever; a gear plate arranged at a lower end of the base frame and an outside gear formed along an outer circumferential surface thereof, wherein when the lock pin lever is operated, the outside gear is engaged with the inside gear of the base frame so that the inside gear rotates.

12 Claims, 6 Drawing Sheets

VEHICLE SEAT FRAME

CROSS REFERENCE TO RELATED APPLICATION

The present application claims priority to Korean Patent Application No. 10-2021-0131899, filed Oct. 5, 2021, the entire contents of which is incorporated herein for all purposes by this reference.

BACKGROUND OF THE INVENTION

Field of the Invention

The present invention relates to a vehicle seat frame and, more particularly, to a vehicle seat frame configured to remove a latch from a conventional memory easy entry module, to apply a memory function using a memory gear, and perform back-folding by a recliner in an easy entry operation.

Description of the Related Art

In recent, many technological developments are being carried out for devices that facilitate a driver's boarding and alighting a vehicle, and an easy entry and a recliner of a vehicle seat are included in the devices.

In a case of a conventional memory easy entry module, a back frame and a recliner are separated from each other and are locked by a latch of the easy entry module, and in an easy entry operation, the easy entry is operated by releasing the latch and folding the back frame forward.

The conventional memory easy entry module has a problem in that additional gap management for the easy entry module is required because the back frame and the recliner are separated from each other in the easy entry module managing a gap of the seat back frame. In addition, the conventional easy entry module is not applied to the general recliner type frame in common, so that there is a problem in that it is difficult to apply the easy entry module to various vehicle types. There is a need for a method in which there is no need to separate the back frame from the recliner, so the collision strength of the back frame is maintained, and simultaneously reduction in the weight of the easy entry module is possible, as the latch is removed from the conventional memory easy entry module, the memory function is applied using the memory gear, and the back-folding is performed by the recliner in an easy entry operation.

The foregoing described is intended merely to aid in the understanding of the background of the present invention, and is not intended to mean that the present invention falls within the purview of the related art that is already known to those skilled in the art.

SUMMARY OF THE INVENTION

The present invention is intended to provide a vehicle seat frame configured to remove a latch from a conventional memory easy entry module and apply a memory function by using a memory gear, to perform back-folding by a recliner in an easy entry operation so that there is no need to separate a back frame and the recliner from each other and a collision strength of the back frame is maintainable, and to reduce the weight of the easy entry module.

In order to achieve the above objective, according to one aspect of the present invention, there is provided a vehicle seat frame including: a base frame arranged at a vehicle seat, the base frame having a placing space therein; a lock pin lever formed at a center portion of the placing space; an inside gear configured to rotate along an inner surface of the placing space in an operation of the lock pin lever; a gear plate arranged at a lower end of the base frame; and an outside gear formed along an outer circumferential surface thereof, wherein when the lock pin lever is operated, the outside gear may be engaged with the inside gear of the base frame so that the inside gear may rotate.

The base frame and the gear plate may be arranged at a support part of the vehicle seat.

The inside gear formed in the base frame may have a through hole at a center portion thereof, and the lock pin lever may be formed by being extended upward from the through hole.

When the lock pin lever is operated, the inside gear may rotate counterclockwise along the inner surface.

The vehicle seat frame may include a recliner lever is arranged at an upper portion of the base frame, a gear lever locking a center portion of the inside gear.

When the recliner lever is operated, as the gear lever rotates, the outside gear may be engaged with the inside gear of the base frame and the inside gear may rotate.

When the inside gear rotates and stops, the lock pin lever may rotate clockwise and a lock pin may be inserted into the inside gear, and simultaneously the recliner lever may be released.

When the inside gear is restored to an initial position thereof, the lock pin lever may rotate counterclockwise and a lock pin may be released toward an outside space of the inside gear, and simultaneously the recliner lever may be locked.

When the inside gear is restored to an initial position thereof, the gear lever may rotate clockwise and simultaneously may be separated from the outside gear.

The inside gear may include a gear spring, and when the lock pin lever is not operated, the inside gear may maintain an initial position thereof by the gear spring.

An outer diameter of the outside gear may be larger than an outer diameter of the inside gear.

The outside gear may be arranged at an upper portion of the gear plate, and when the lock pin lever is operated, the outside gear may be engaged with the inside gear of the base frame and the inside gear may rotate.

The present invention relates to the vehicle seat frame, and the vehicle seat frame is configured such that the latch is removed from the memory easy entry module, the memory function is applied using the memory gear, a back-folding is performed by the recliner in an easy entry operation so that there is no need to separate the back frame and the recliner from each other, and the collision strength of the back frame can be maintained and reduction in the weight of the easy entry module is possible.

Furthermore, occurrence of additional quality managing points can be reduced and the present invention can be applied to a general recliner type frame in common, so that application to various vehicle types can be achieved.

The effect of the present disclosure is not limited to the above description, and other effects not mentioned will be clearly understood by those skilled in the art from the subsequent description.

DETAILED DESCRIPTION OF THE INVENTION

In the following description, the structural or functional description specified to exemplary embodiments according to the concept of the present invention is intended to describe the exemplary embodiments, so it should be understood that the present invention may be variously embodied, without being limited to the exemplary embodiment. Hereinbelow, an embodiment of the present invention will be described in detail with reference to accompanying drawings.

Figure 1:
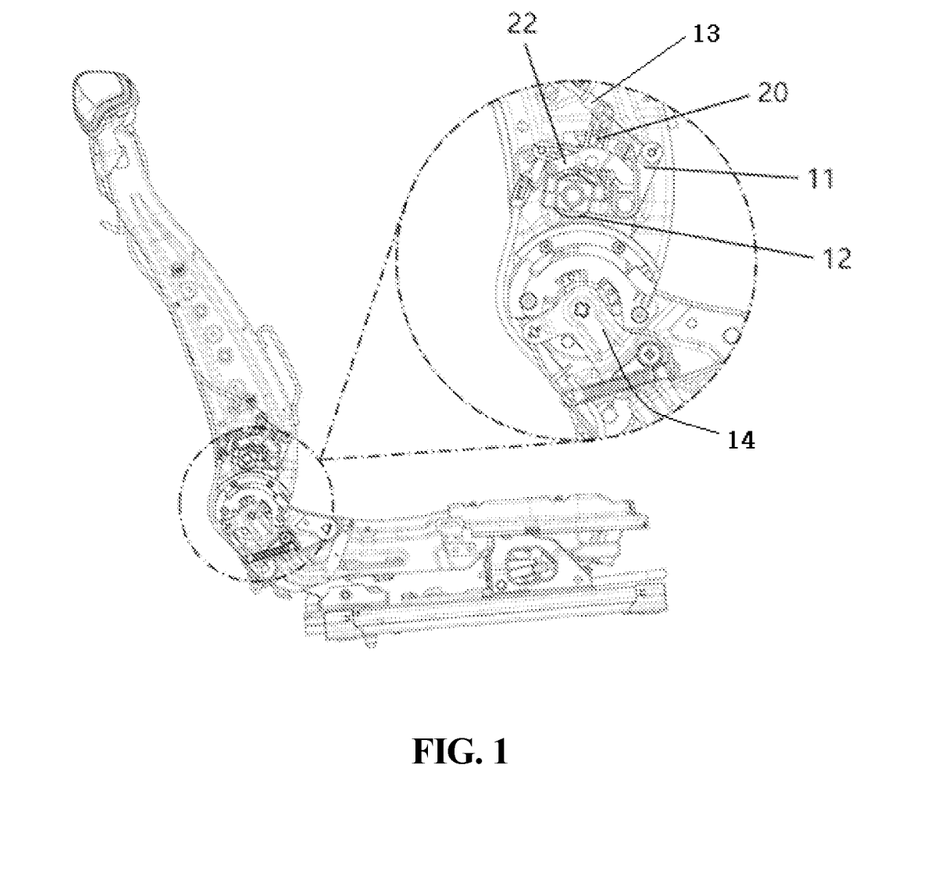
FIG. 1 is a view showing a vehicle seat frame according to an embodiment of the present invention.
Figure 2:
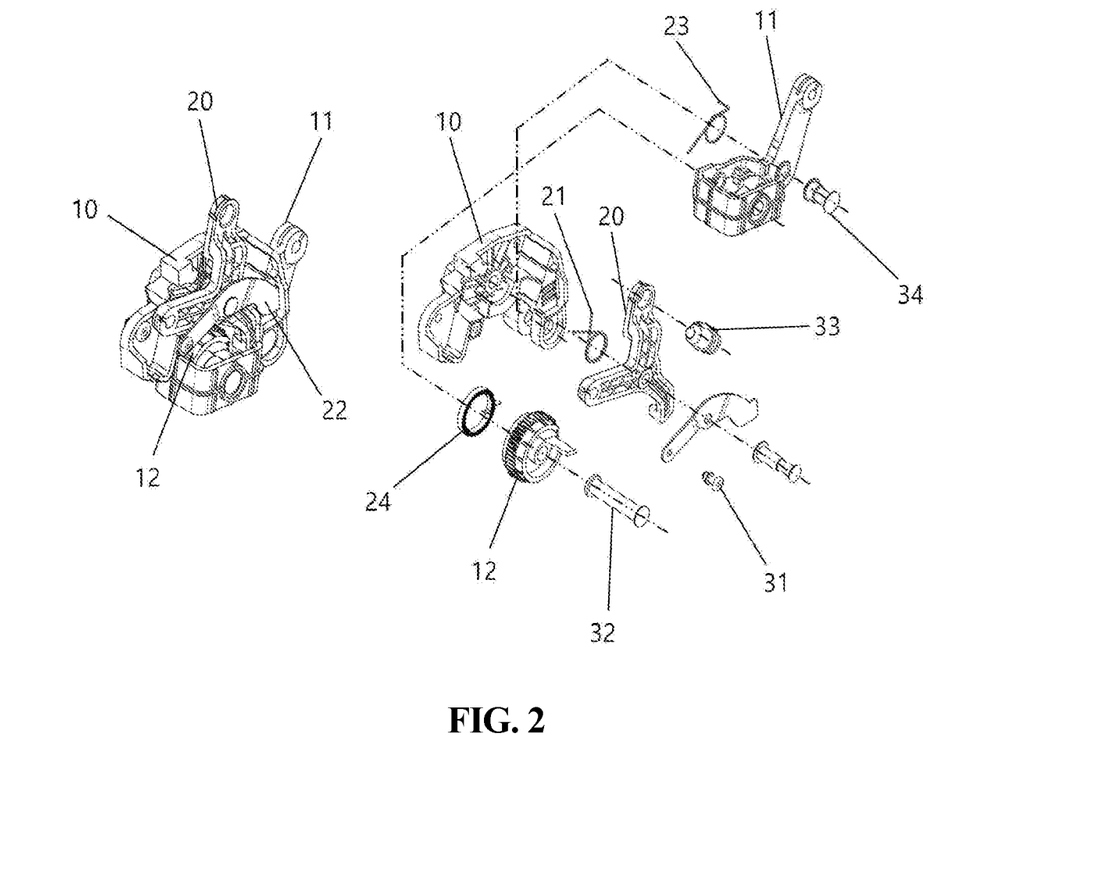
FIG. 2 is a view showing a detailed structure of a base frame constituting the vehicle seat frame.
Figure 3:
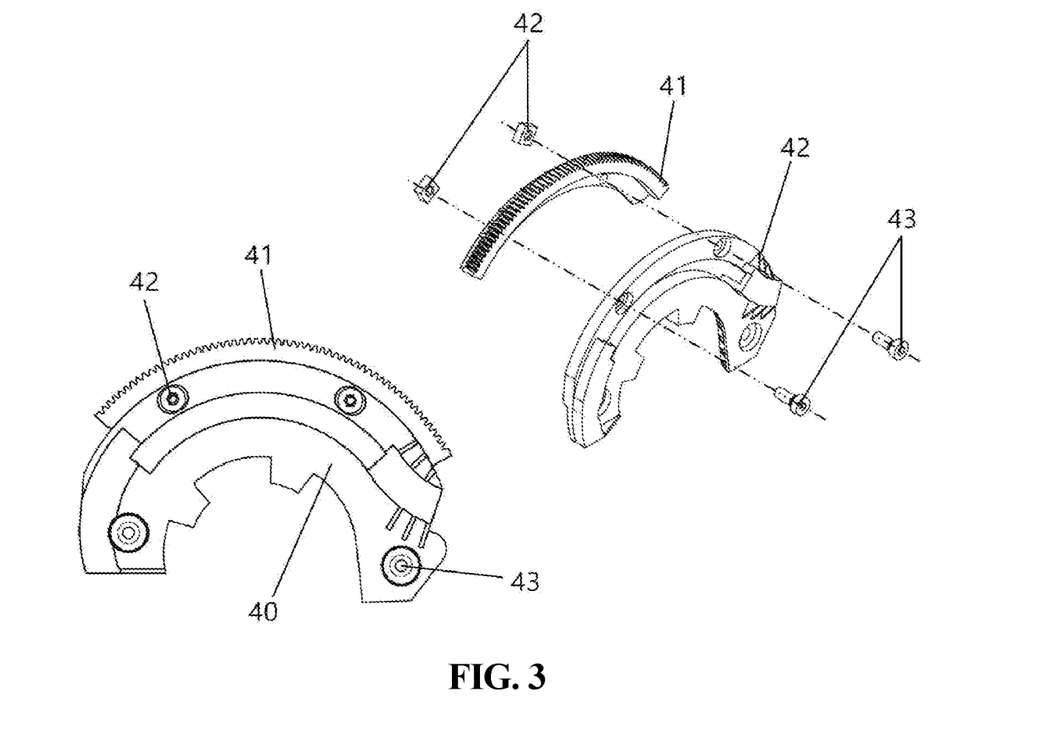
FIG. 3 is a view showing a detailed structure of a gear plate constituting the vehicle seat frame.
Figure 4:
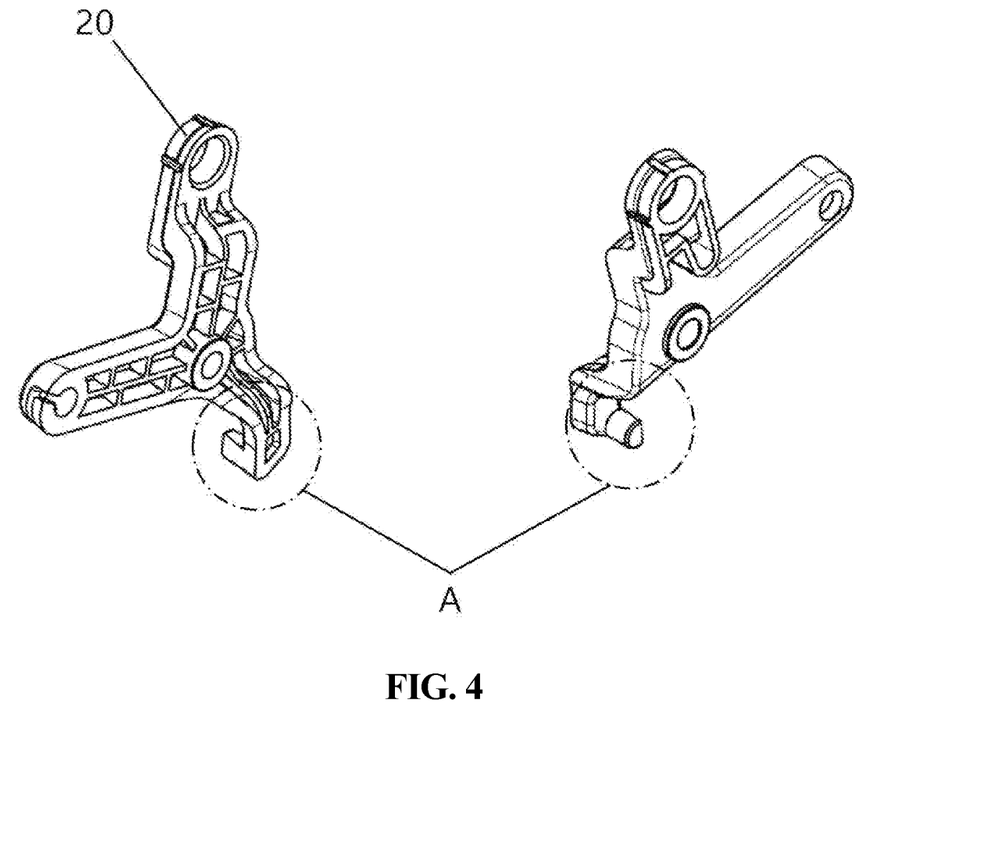
FIGS. 4 to 6 are views showing a lock pin lever, an inside gear, and a gear lever, respectively.
Figure 5:
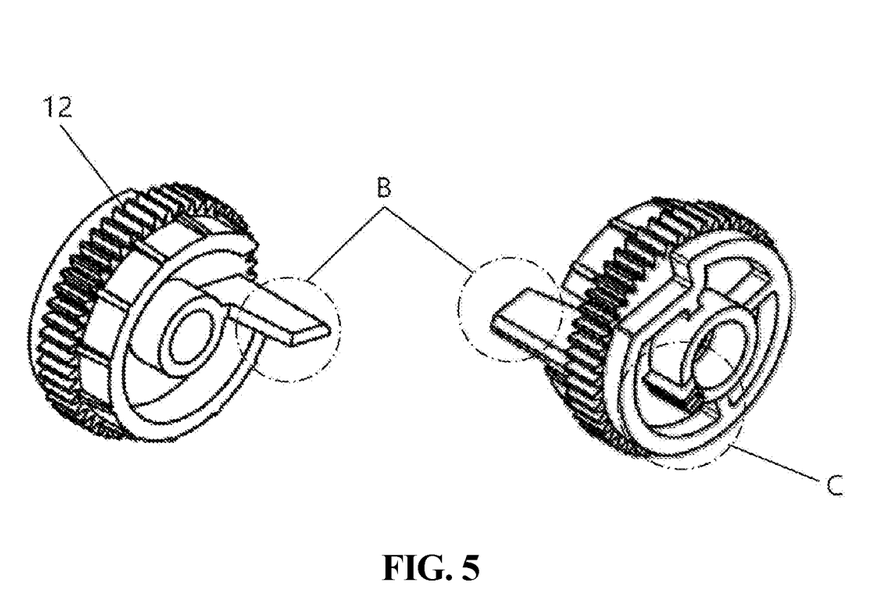
Figure 6:
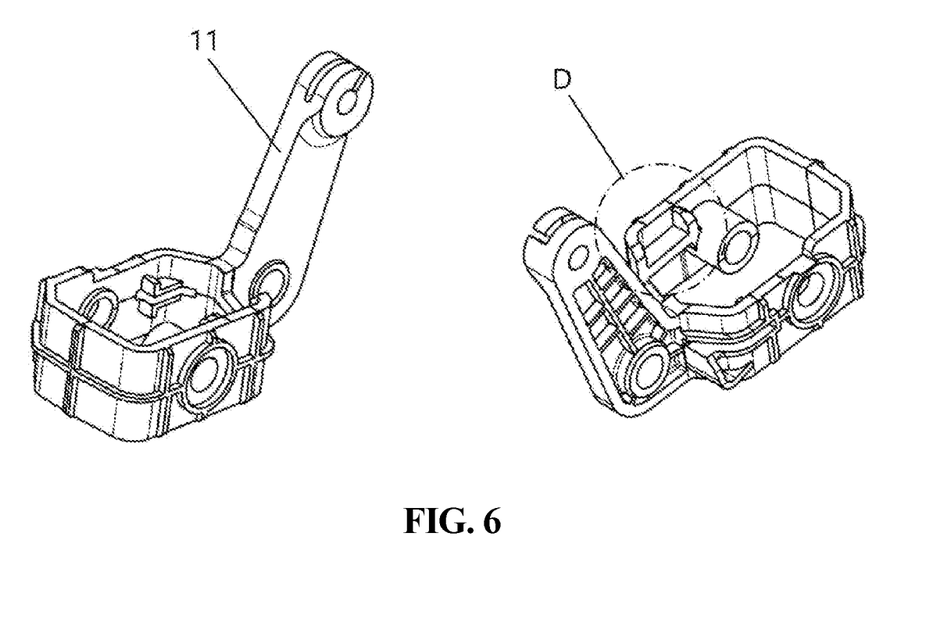

FIG. 1 is a view showing a vehicle seat frame according to an embodiment of the present invention. FIG. 2 is a view showing a detailed structure of a base frame constituting the vehicle seat frame. FIG. 3 is a view showing a detailed structure of a gear plate constituting the vehicle seat frame. FIGS. 4 to 6 are views showing a lock pin lever, an inside gear, and a gear lever, respectively.

FIG. 1 is a view showing a vehicle seat frame according to an embodiment of the present invention. FIG. 2 is a view showing a detailed structure of a base frame 10 constituting the vehicle seat frame.

Referring to FIGS. 1 and 2, the vehicle seat frame includes: the base frame 10 arranged at a vehicle seat, having a placing space therein, including a lock pin lever 20 formed at a center portion of the placing space, and including an inside gear 12 configured to rotate along an inner surface constituting the placing space when the lock pin lever 20 is operated; and a gear plate 40 arranged at a lower end of the base frame 10, and including an outside gear 41 formed along an outer circumferential surface thereof, wherein when the lock pin lever 20 is operated, the outside gear 41 is engaged with the inside gear 12 of the base frame 10 so that the inside gear 12 rotates.

The present invention is characterized in that a memory function is applied by using a memory gear without a latch, and a back-folding is operated by a recliner in an easy entry operation so that there is no need to separate a back frame from the recliner. To this end, when the lock pin lever 20 is operated, the outside gear 41 is engaged with the inside gear 12 of the base frame 10 so that the inside gear 12 rotates. In a case of a general memory easy entry module, a back frame and a recliner are separated from each other and are locked by a latch of the easy entry module, and in an easy entry operation, the easy entry is performed by releasing the latch and folding the back frame forward. The conventional memory easy entry module requires additional gap management because a back frame and a recliner are separated from each other in the easy entry module managing a gap of the seat back frame, and it is difficult to apply the easy entry module to various vehicle types because the easy entry module cannot be applied to a general recliner type frame in common. There is a need for a method in which there is no need to separate the back frame from the recliner, so the collision strength of the back frame is maintained, and simultaneously reduction in the weight of the easy entry module is possible, as the latch is removed from the conventional memory easy entry module, the memory function is applied using the memory gear, and the back-folding is performed by the recliner in an easy entry operation.

Therefore, the present invention relates to the vehicle seat frame, and the vehicle seat frame is configured such that the latch is removed from the memory easy entry module, the memory function is applied using the memory gear, a back-folding is performed by the recliner in an easy entry operation so that there is no need to separate the back frame and the recliner from each other, and the collision strength of the back frame can be maintained and reduction in the weight of the easy entry module is possible.

Specifically, referring to FIG. 1, the base frame 10 is arranged at the vehicle seat and has the placing space therein, has the lock pin lever 20 formed at the center portion of the placing space, and has the inside gear 12 rotating along the inner surface of the placing space when the lock pin lever 20 is operated. The base frame 10 is arranged at the upper portion of the gear plate 40, and the inside gear 12 is provided in the placing space formed in the base frame 10, and the inside gear 12 is engaged with the outside gear 41 of the gear plate 40 arranged at the lower portion of the gear plate 40 so that the inside gear 12 is operated. A gear lever 11 arranged at the base frame 10 and extended upward is fixed to the base frame 10 by a gear lever shaft 34 and a lever spring 23, and a lock pin lever 20 arranged at the center portion of the base frame 10 is fixed to the base frame 10 by a lever spring 21, a cable cap 33, and a lever shaft 30, and a lever cover 22 is arranged outside the lock pin lever 20. A gear spring 24 is arranged inside the gear lever 11 and is fixed to the base frame 10 by a gear shaft 32. FIG. 3 is a view showing a detailed structure of the gear plate 40 constituting the vehicle seat frame. Referring to FIG. 3, the gear plate 40 is arranged at the lower end of the base frame 10 and the outside gear 41 is formed along the outer circumferential surface of the gear plate 40. When the lock pin lever 20 is operated, the outside gear 41 is engaged with the inside gear 12 of the base frame 10 so that the inside gear 12 rotates. The outside gear 41 is fixed to the gear plate 40 by a bolt 43 and a nut 42. Therefore, the vehicle seat frame may be provided to have the base frame 10 and the gear plate 40 so as to prevent the back frame and the recliner from being separated from each other and to maintain a collision strength of the back frame to reduce the weight of the easy entry module.

The base frame 10 and the gear plate 40 may be arranged at a vehicle seat support part.

The vehicle seat support part means a location connecting a portion where a user leans back to a portion where the user sits on. In order to prevent the back frame and the recliner from being separated, the base frame 10 and the gear plate 40 may be arranged at the vehicle seat support part. The base frame 10 and the gear plate 40 are configured to perform an integrated operation so that back-folding is performed by the recliner in an easy entry operation.

The inside gear 12 formed in the base frame 10 has a through hole at the center portion, and the lock pin lever 20 is formed by being extended upward from the through hole. Furthermore, when the recliner lever 14 is operated, as the gear lever 11 rotates, the outside gear 41 is engaged with the inside gear 12 of the base frame 10 so that the inside gear 12 rotates. Furthermore, the outside gear 41 is arranged at an upper portion of the gear plate 40, and when the lock pin lever 20 is operated, the outside gear 41 is engaged with the inside gear 12 of the base frame 10 so that the inside gear 12 is operated.

A flat portion of a lower end of the gear lever 11 and the gear shaft 32 are fixed to the base frame 10 via the through hole formed at the center portion of the inside gear 12. A downward extended portion of the gear lever 11 is connected to the center portion of the inside gear 12 and an upward extended portion of the gear lever 11 is connected to the recliner lever 14 arranged at the upper portion of the base frame 10, and when the recliner lever 14 is operated, as the gear lever 11 rotates, the outside gear 41 is engaged with the inside gear 12 of the base frame 10 so that the inside gear 12 rotates. Therefore, integration of the back frame and the recliner that are arranged at the vehicle seat frame are achieved. In order to engage the inside gear 12 of the base frame 10 so that the inside gear 12 rotates, the outside gear 41 is arranged at the upper portion of the gear plate 40 and an efficient structure for light weight and quality can be formed.

FIGS. 4 to 6 are views showing the lock pin lever 20, the inside gear 12, and the gear lever 11, respectively.

Referring to FIGS. 4 to 6, when the lock pin lever 20 is operated, the inside gear 12 may rotate counterclockwise along the inner surface. Furthermore, when the inside gear 12 rotates and stops, the lock pin lever 20 may rotate clockwise and a lock pin A may be inserted into the inside gear 12 and simultaneously the recliner lever 14 may be released.

When the easy entry is operated, both of the inside gear 12 and the gear lever 11 rotate counterclockwise. At this point, when the inside gear 12 rotates counterclockwise and reaches to an angle preset by the user, the lock pin lever 20 rotates, and the lock pin A is inserted into the inside gear 12 and simultaneously the recliner lever 14 is released.

The vehicle seat frame may include the recliner lever 14 arranged at the upper portion of the base frame 10, and the gear lever 11 locking the center portion of the inside gear 12.

The recliner lever 14 is arranged at the upper portion of the base frame 10, and when the user preset the recliner, as the gear lever 11 rotates, the outside gear 41 is engaged with the inside gear 12 of the base frame 10 so that the inside gear 12 rotates. Furthermore, the gear lever 11 is fixed to the base frame 10 by the gear lever shaft 34 and the gear lever spring 23, and as the gear lever 11 rotates, the outside gear 41 is engaged with the inside gear 12 of the base frame 10 so that the inside gear 12 rotates. The lock pin lever 20 is fixed to the center portion of the base frame 10 with the inside gear 12, and when the inside gear 12 rotates and stops, the lock pin lever 20 rotates clockwise and the lock pin A is inserted into the inside gear 12. Integration of the base frame 10 and the gear plate 40 is performed by the recliner lever 14, the gear lever 11, and the lock pin lever 20 arranged at the base frame 10, so that a back-folding is performed by the recliner in an easy entry operation.

When the inside gear 12 is restored to an initial position, the lock pin lever 20 rotates counterclockwise and the lock pin A is released toward the outside space of the inside gear 12 and simultaneously the recliner lever 14 is locked. Furthermore, when the inside gear 12 is restored to an initial position, the gear lever 11 rotates clockwise and simultaneously is separated from the outside gear.

When the easy entry lever 13 is restored to an initial position thereof, in a state in which the inside gear 12 and the outside gear 41 are maintained in the engaged state and the easy entry lever 13 is not operated, at first, the back frame moves in a restoring direction. Then, a memory stopper 1 B is fastened to a memory stopper 2 D formed at the gear lever 11 so that the back frame is locked. Then, as the lock pin lever 20 rotates counterclockwise by the lever spring 21, the lock pin A is released toward the outside space of the inside gear 12 and simultaneously the recliner lever 14 is locked, so that the easy entry is restored. As the gear lever 11 rotates clockwise, the inside gear 12 and the outside gear 41 are separated from each other, and separation of the gear lever 11 is performed by the gear lever spring 23 assembled to a hinge part.

The gear spring 24 is formed at the inside gear 12, and when the lock pin lever 20 is not operated, the inside gear 12 may maintain an initial position thereof by the gear spring 24.

When an easy entry function is not operated, the user can maintain the initial state of the easy entry function and the initial state of a recliner function, so that the vehicle seat frame should maintain the positions thereof. Therefore, when the recliner lever 14 is not operated, the inside gear 12 is locked to the initial location thereof by the gear spring 24, so that the inside gear 12 may be controlled to prevent the inside gear 12 from rotate while being engaged with the outside gear 41.

An outer diameter of the outside gear 41 may be larger than an outer diameter of the inside gear 12.

The engaged gears are different in gear ratio due to outer diameters thereof, so that when the outside gear 41 and the inside gear 12 have different outer diameters, gear ratios thereof are different from each other. When the outer diameter of the outside gear 41 is larger than the outer diameter of the inside gear 12, the inside gear 12 rotates faster than the outside gear 41. Therefore, the base frame 10 with the fast rotating inside gear 12 may rotate more dynamically than the gear plate 40, so user's convenience can be promoted.

Eventually, in the easy entry operation, a back-folding is performed by the recliner, so that there is no need to separate the back frame and the recliner from each other, and the collision strength of the back frame can be maintained and reduction in the weight of the easy entry module can be achieved. Furthermore, occurrence of additional quality managing points can be reduced and the present invention can be applied to a general recliner type frame in common, so that the present invention can be applied to various vehicle types.

Although the preferred embodiment of the present invention has been disclosed for illustrative purposes, those skilled in the art will appreciate that various modifications, additions, and substitutions are possible, without departing from the spirit and scope of the present invention.

What is claimed is:

1. A vehicle seat frame comprising:
   a base frame arranged at a vehicle seat, the base frame including a placing space therein;
   a lock pin lever formed at a center portion of the placing space;
   an inside gear configured to rotate along an inner surface of the placing space in an operation of the lock pin lever; and
   a gear plate arranged at a lower end of the base frame and including an outside gear formed along an outer circumferential surface thereof,
   wherein when the lock pin lever is operated, the outside gear is engaged with the inside gear of the base frame so that the inside gear rotates.

2. The vehicle seat frame of claim 1, wherein the base frame and the gear plate are arranged at a support part of the vehicle seat.

3. The vehicle seat frame of claim 1, wherein the inside gear formed in the base frame has a through hole at a center portion thereof, and the lock pin lever is formed by being extended upward from the through hole.

4. The vehicle seat frame of claim 1, wherein when the lever is operated, the inside gear rotates counterclockwise along the inner surface.

5. The vehicle seat frame of claim 1, wherein the vehicle seat frame further comprises a recliner lever arranged at an upper portion of the base frame, and a gear lever locking a center portion of the inside gear.

6. The vehicle seat frame of claim 5, wherein when the recliner lever is operated, as the gear lever rotates, the outside gear is engaged with the inside gear of the base frame and the inside gear rotates.

7. The vehicle seat frame of claim 5, wherein when the inside gear rotates and stops, the lock pin lever rotates clockwise and a lock pin is inserted into the inside gear, and simultaneously the recliner lever is released.

8. The vehicle seat frame of claim 5, wherein when the inside gear is restored to an initial position thereof, the lock pin lever rotates counterclockwise and a lock pin is released toward an outside space of the inside gear, and simultaneously the recliner lever is locked.

9. The vehicle seat frame of claim 5, wherein when the inside gear is restored to an initial position thereof, the gear lever rotates clockwise and simultaneously is separated from the outside gear.

10. The vehicle seat frame of claim 1, wherein the inside gear comprises a gear spring, and when the lock pin lever is not operated, the inside gear maintains an initial position thereof by the gear spring.

11. The vehicle seat frame of claim 1, wherein an outer diameter of the outside gear is larger than an outer diameter of the inside gear.

12. The vehicle seat frame of claim 1, wherein the outside gear is arranged at an upper portion of the gear plate, and when the lock pin lever is operated, the outside gear is engaged with the inside gear of the base frame and the inside gear rotates.

* * * * *